(12) United States Patent
Sun

(10) Patent No.: US 11,240,011 B2
(45) Date of Patent: Feb. 1, 2022

(54) OBJECT SHARING SYSTEM AND OBJECT SHARING METHOD

(71) Applicant: Industrial Technology Research Institute, Hsinchu (TW)

(72) Inventor: Po-Ling Sun, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 282 days.

(21) Appl. No.: 16/551,683

(22) Filed: Aug. 26, 2019

(65) Prior Publication Data

US 2020/0274698 A1 Aug. 27, 2020

(30) Foreign Application Priority Data

Feb. 27, 2019 (TW) ................... 108106920

(51) Int. Cl.
  *H04L 9/08* (2006.01)
  *H04L 9/30* (2006.01)
(52) U.S. Cl.
  CPC ............ *H04L 9/085* (2013.01); *H04L 9/0819* (2013.01); *H04L 9/0869* (2013.01);
  (Continued)
(58) Field of Classification Search
  None
  See application file for complete search history.

(56) References Cited

U.S. PATENT DOCUMENTS 8,010,671 B2 * 8/2011 Tullis ...................... H04L 67/02
  709/226

9,077,580 B1 * 7/2015 Randhawa .......... H04L 67/1023
  (Continued)

FOREIGN PATENT DOCUMENTS

CN   103023968   4/2013
CN   104424719   3/2015
  (Continued)

OTHER PUBLICATIONS

Chao Peng et al., "Design and Implementation of a Copyright Protection System Based on Digital Watermarking with Visual Cryptography", Computer Science and Application, vol. 5, No. 8, Aug. 2015, pp. 285-296.
  (Continued)

*Primary Examiner* — Eleni A Shiferaw
*Assistant Examiner* — Bassam A Noaman
(74) *Attorney, Agent, or Firm* — JCIPRNET

(57) ABSTRACT

An object sharing system and an object sharing method are provided. The system includes a plurality of shared objects and a plurality of data servers. The shared objects are respectively provided by a plurality of object suppliers. The data servers are respectively provided by the object suppliers and connected to form a distributed data redundancy network so as to store a plurality of sub-secret data separated from shared secret information in a decentralized way. The data server of each of the object suppliers is connected to the shared objects provided by the object supplier, and collects a required quantity of sub-secret data for reconstructing the shared secret information via the distributed data redundancy network so as to reconstruct the shared secret information configured to verify an access right to the shared object for a user device when receiving an access request for the shared object from the user device.

18 Claims, 8 Drawing Sheets

(52) U.S. Cl.
CPC .......... *H04L 9/0894* (2013.01); *H04L 9/3026* (2013.01); *H04L 9/3073* (2013.01)

(56) References Cited

U.S. PATENT DOCUMENTS

| | | | |
|---|---|---|---|
| 11,032,259 B1* | 6/2021 | Bernat | H04L 63/061 |
| 2009/0063668 A1* | 3/2009 | Bish | G06F 11/1662 709/223 |
| 2012/0042202 A1* | 2/2012 | Wenzel | G06F 11/2023 714/6.3 |
| 2016/0241400 A1 | 8/2016 | Wolf | |
| 2017/0180128 A1 | 6/2017 | Lu | |
| 2018/0241565 A1* | 8/2018 | Paolini-Subramanya | H04L 63/123 |
| 2019/0138952 A1* | 5/2019 | Han | G06Q 10/02 |

FOREIGN PATENT DOCUMENTS

| | | |
|---|---|---|
| CN | 105356997 | 2/2016 |
| CN | 107623569 | 1/2018 |
| CN | 107993359 | 5/2018 |
| TW | I629658 | 7/2018 |

OTHER PUBLICATIONS

Riham Altawy et al., "Lelantos: A Blockchain-based Anonymous Physical Delivery System", 15th Annual Conference on Privacy, Security and Trust, Aug. 28-30, 2017, pp. 1-12.

Eleftherios Kokoris-Kogias et al., "Hidden in Plain Sight: Storing and Managing Secrets on a Public Ledger", IACR Cryptology ePrint Archive 2018, Feb. 22, 2018. pp.1-20.

Quinten Stokkink et al, "Deployment of a Blockchain-Based Self-Sovereign Identity", ArXiv, Jun. 5, 2018, pp. 1-7.

Fu Xiao-Tong et al, "Proxy-cryptocurrency payment system", Journal on Communications, vol. 38, No. 7, Jul. 2017, pp. 1-8.

"Office Action of Taiwan Counterpart Application," dated Dec. 25, 2019, p. 1-p. 4.

* cited by examiner

OBJECT SHARING SYSTEM AND OBJECT SHARING METHOD

CROSS-REFERENCE TO RELATED APPLICATION

This application claims the priority benefit of Taiwan application no. 108106920, filed on Feb. 27, 2019. The entirety of the above-mentioned patent application is hereby incorporated by reference herein and made a part of this specification.

TECHNICAL FIELD

The disclosure relates to an object sharing system, and more particularly, to an object sharing system and a method thereof using a distributed architecture.

BACKGROUND

With recent advance in technology, the network has become an indispensable source for obtaining information to people nowadays. However, as more and more technologies are developed based on networks, information security becomes one of the most significant issues to be discussed.

Most of the current networks at this stage adopt use of a centralized architecture which uses a central arbiter to determine facts and assess the accuracy of the recorded data. However, due to the low level of trust between vendors and the doubts about interoperability of the centralized architecture, managers of the centralized architecture are unable to self-certify when there is a dispute. As a result, such information security exchange is questioned and the cost of building trust is so high that another new information isolated island is formed and a shared spirit is hard to achieve.

Furthermore, since the centralized architecture aggregates data from multiple sources to a single node, once being attacked, there is a risk of a single node failure or a data leakage. In addition, since the accuracy of the data is only maintained unilaterally, it is very difficult to discover data tampering on a part of the data or the data at a specific time point without a proper confirmation mechanism.

SUMMARY

The disclosure provides an object sharing system that includes a plurality of shared objects and a plurality of data servers. The shared objects are respectively provided by a plurality of object suppliers; and the data servers are respectively provided by the object suppliers and connected to form a distributed data redundancy network so as to store a plurality of sub-secret data separated from shared secret information in a decentralized way. The data server of each of the object suppliers is connected to the shared objects provided by the object supplier, and collects a required quantity of sub-secret data for reconstructing the shared secret information via the distributed data redundancy network so as to reconstruct the shared secret information for verifying an access right to the shared object for a user device when receiving an access request for the shared object from the user device.

The disclosure provides an object sharing method, which is adapted to an objecting sharing system composed of a plurality of shared objects and a plurality of data servers respectively provided by a plurality of object suppliers. Each of the data servers is connected to each other to form a distributed data redundancy network. The method includes: storing a plurality of sub-secret data separated from shared secret information by the data servers in a decentralized way; receiving an access request sent by a user device by one of the shared objects; collecting a required quantity of the sub-secret data for reconstructing the shared secret information via the distributed data redundancy network by the data server connected to the shared object; and reconstructing the shared secret information using the collected sub-secret data for verifying an access right to the shared object for the user device by the shared object or the data server connected to the shared object.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
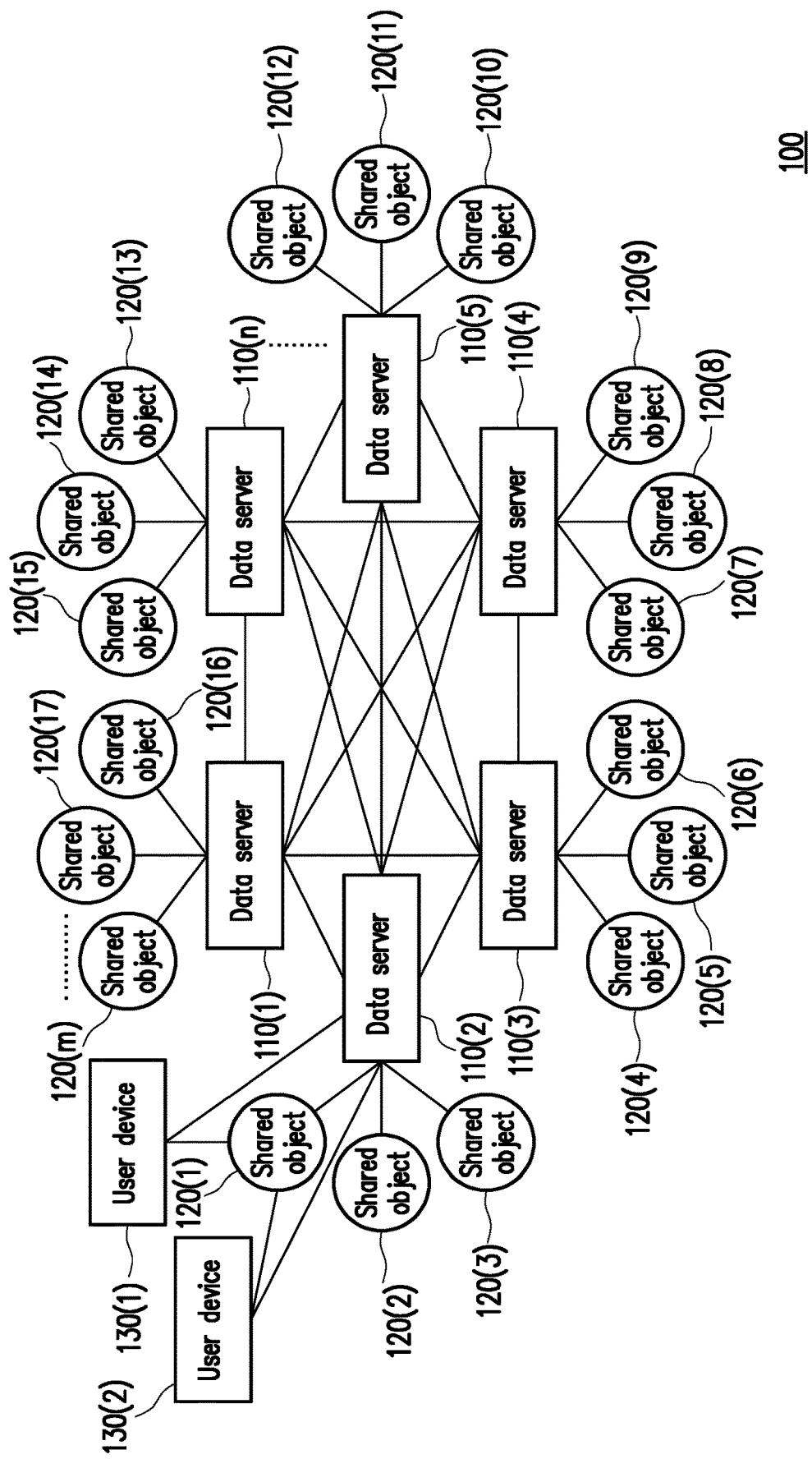
FIG. 1 is a block diagram of an objecting sharing system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure proposes an object sharing system and a method thereof. The system adopts a distributed network architecture so each object supplier can provide one server to form a multi-center distributed network architecture. With such architecture, one copy of data that can be publicly queried is stored in each of the other servers so the data can be updated and its data integrity can be checked by each of the servers to reduce the risk of centralized single point attack. In addition, this system also allows each object supplier to have the functions of self identification verification and authority control without the need to exchange customer data, which can reduce the security concerns between the suppliers and help to improve the willingness of the object suppliers to share information with each other.

FIG. 1 is a block diagram of an objecting sharing system according to an exemplary embodiment of the disclosure. With reference to FIG. 1, an object sharing system 100 includes a plurality of data servers 110(1) to 110(n) and a plurality of shared objects 120(1) to 120(m). Among them, m and n may be any integer without particular limitations. In this embodiment, the shared objects 120(1) to 120(m) may be respectively provided by a plurality of object suppliers (not illustrated). Also, the data servers 110(1) to 110(n) may be respectively provided by the object suppliers, and connected to each other based on a block chain technology to form a distributed data redundancy network. In this embodiment, each of the object suppliers provides, for example, three shared objects and one data server. However, the number of the shared objects and the number of the data servers provided by each of the object suppliers are not particularly limited in this embodiment. In addition, the data servers 110(1) to 110(n) of the object suppliers may be connected to the shared objects provided by the respective object supplier (e.g., the data server 110(2) may be connected to the shared objects 120(1) to 120(3)).

Aforesaid object supplier may be a shared cabinet supplier or a sharing truck company, and the shared objects 120(1) to 120(m) may be a smart product pick-up station or a truck. The object supplier and the shared objects 120(1) to 120(m) are not particularly limited in this embodiment. In an embodiment, the object sharing system 100 may further include a key management module (not illustrated), a secret information distributing module (not illustrated) and a secret information reconstructing module (not illustrated) installed on each of the data servers 110(1) to 110(n) for managing public and private keys and sharing secret information for a user device, the data servers 110(1) to 110(n) and the shared objects 120(1) to 120(m), and details regarding the same will be described later.

Here, a user device 130(1), a user device 130(2), the shared object 120(1) and the data server 110(2) participating in a sharing of the shared object 120(1) are taken as an example to describe the disclosure more clearly.

Figure 2:
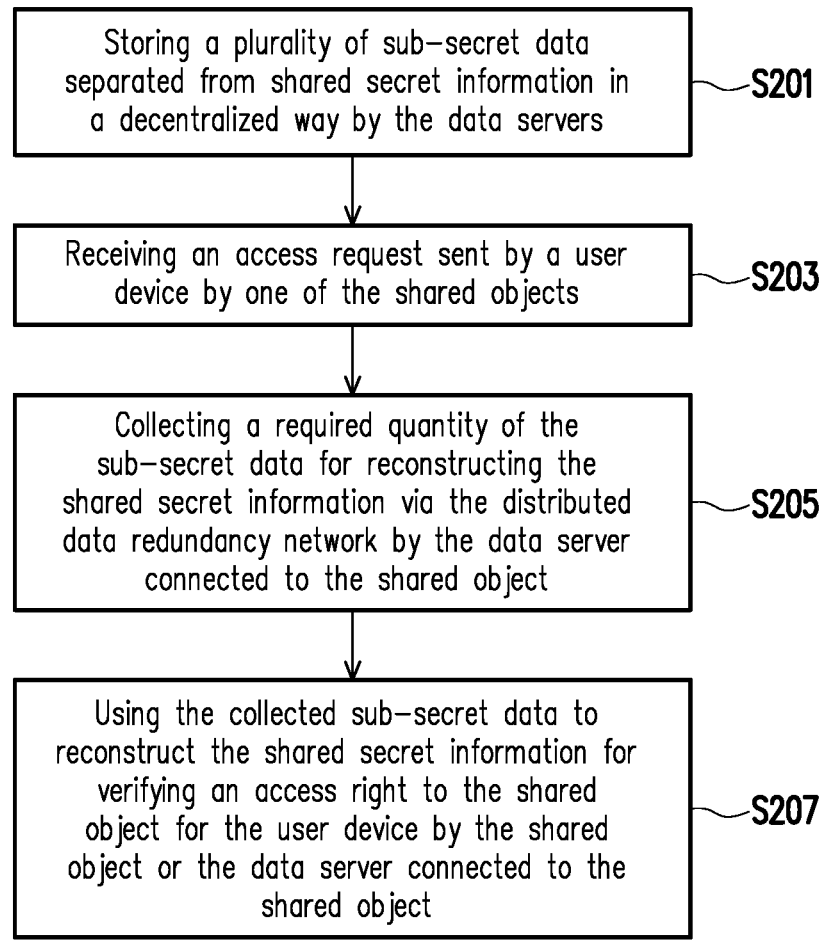
FIG. 2 is a flowchart of an objecting sharing method according to an exemplary embodiment of the disclosure.

FIG. 2 is a flowchart of an objecting sharing method according to an exemplary embodiment of the disclosure. Referring to FIG. 1 and FIG. 2 together, the method of this embodiment is adapted to the object sharing system 100 of FIG. 1, and detailed steps in the object sharing method according to the embodiment of the disclosure will be described below with reference to operating relations between the devices in the object sharing system 100.

First, in step S201, a plurality of sub-secret data separated from shared secret information are stored by the data server 110(2) in a decentralized way. Specifically, the data server 110(2) can separate the shared secret information into multiple sub-secret data so as to store the sub-secret data to the data servers 110(1) to 110(n) in a decentralized way. The shared secret information is, for example, a key or other verification information for opening the shared object 120(1), which is not particularly limited here. Details regarding how the data server 110(2) separates the shared secret information into the sub-secret data will be described later.

Next, in step S203, an access request sent by the user device 130(2) is received by one of the shared objects 120(1) to 120(m). Specifically, when the user device 130(2) needs to use the shared object 120(1), the user device 130(2) can transmit the access request to the shared object 120(2).

Next, in step S205, a required quantity of the sub-secret data for reconstructing the shared secret information is collected via the distributed data redundancy network (i.e., comprises the data servers 110(1) to 110(n)) by the data server 110(2) connected to the shared object 120(1). Here, the required quantity may be any integer preset for the object sharing system 100. In an embodiment, the object sharing system 100 can divide a plurality of participants participating in the sharing of the shared object 120(1) by 2 and obtain a value from the result being rounded up, so as to set the required quantity for reconstructing the shared secret information to be a minimum integer greater than said value.

Lastly, in step S207, the shared object 120(1) or the data server 110(2) connected to the shared object 120(1) uses the collected sub-secret data to reconstruct the shared secret information for verifying an access right to the shared object 120(1) for the user device 130(2). Specifically, when the shared object 120(1) or the data sever 110(2) connected to the shared object 120(1) successfully reconstructs the shared secret information by using the collected sub-secret data, the shared object 120(1) or the data sever 110(2) connected to the shared object 120(1) provides the user device 130(2) the access right to the shared object 120(1).

In terms of logistics, the user device 130(1) may be a cell phone owned by a sender who sends the package; the shared object 120(1) may be a smart cabinet; the object supplier who provides a service of the shared object 120(1) may be a local logistics operator; the object supplier provides the data server 110(2) for managing the shared objects 120(1) to 120(3); in terms of logistics, the user device 130(2) may be a cell phone owned by a receiver who takes the package; and the receiver is, for example, a deliveryman or the receiver of the package. Nonetheless, the disclosure is not limited to the above.

Through the steps described above, the object sharing system 100 according to the embodiments of the disclosure can separate the shared secret information into the sub-secret data and storing the sub-secret data to the data servers 110(1) to 110(n) in a decentralized way to avoid the risk of centralized single point attack.

Figure 3:
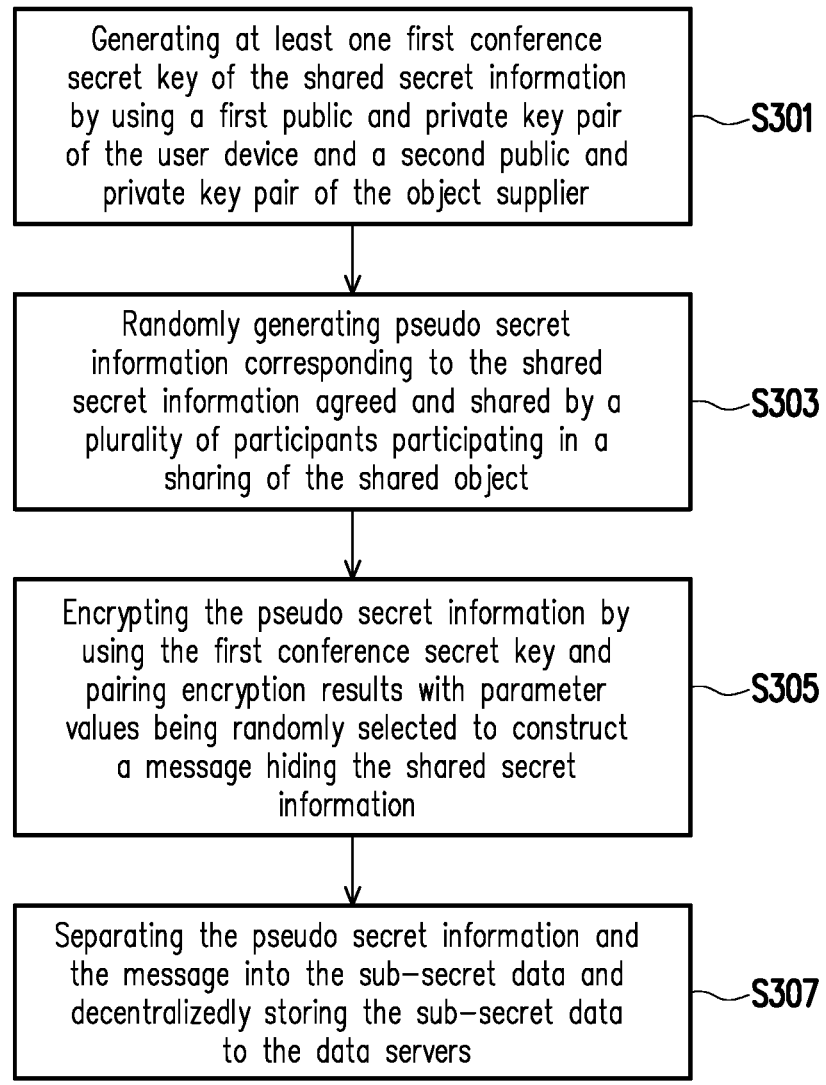
FIG. 3 is a flowchart of a method for storing sub-secret data according to an exemplary embodiment of the disclosure in a decentralized way.

FIG. 3 is a flowchart of a method for storing sub-secret data in a decentralized way according to an exemplary embodiment of the disclosure. Referring to FIG. 1 and FIG. 3 together, the method of this embodiment is adapted to the key management module and the secret information distributing module in the object sharing system 100 of FIG. 1, and detailed steps in the method for storing the sub-secret data in a decentralized way according to the embodiment of the disclosure will be described below with reference to operating relations between the devices in the object sharing system 100.

First, in step S301, the key management module can generate at least one first conference secret key of the shared secret information by using a first public and private key pair of the user device 130 and a second public and private key pair of the object supplier.

For instance, the key management module can generate the public and private key pair of the user device 130(1), 130(2) and the public and private key pair of the object supplier of the shared object 120(1) in advance, and accordingly generate conference secret keys $SK_{SUPPLY,USER1}$, $SK_{SUPPLY,USER2}$ of the object supplier corresponding to the user device 130(1), 130(2) and a conference secret key $SK_{SUPPLY,OBJ}$ of the object supplier corresponding to the shared object 120(1).

Next, in step S303, the secret information distributing module can randomly generate pseudo secret information corresponding to the shared secret information agreed and shared by a plurality of participants participating in a sharing of the shared object 120(1).

For instance, for shared secret information Secret agreed and shared by the user device 130(1), the user device 130(2), the shared object 120(1) and the data server 110(2) participating in the sharing of the shared object 120(1), the secret information distributing module can randomly generate pseudo secret information r corresponding to the shared secret information Secret.

Next, in step S305, the secret information distributing module can encrypt the pseudo secret information by using the first conference secret key generated by the key management module and pair encryption results with parameter values being randomly selected to construct a message hiding the shared secret information.

For instance, the secret information distributing module can perform an encryption (e.g., a symmetric-key algorithm) on the pseudo secret information r by respectively using the conference secret keys $SK_{SUPPLY,USER1}$, $SK_{SUPPLY,USER2}$ of the object supplier corresponding to the user device 130(1), 130(2) and the conference secret key $SK_{SUPPLY,OBJ}$ of the object supplier corresponding to the shared object 120(1) previously generated, so as to obtain encryption results $E(SK_{SUPLY,USER1},r)$, $E(SK_{SUPPLY,USER2},r)$ corresponding to the user device 130(1), 130(2) and an encryption result $E(SK_{SUPPLY,OBJ},r)$ corresponding to the shared object 120 (1). Here, for example, the user device 130(1), 130(2) and the shared object 120(1) respectively and randomly select parameter values $X_{USER1}$, $X_{USER2}$ and $X_{OBJ}$, which are then used in the value pairing with the encryption results described above to generate pairing results $(X_{USER1},E(SK_{SUPLY,USER1},r))$, $(X_{USER2},E(SK_{SUPPLY,USER2},r))$ corresponding to the user device 130(1), 130(2) and a pairing result $(X_{OBJ},E(SK_{SUPPLY,OBJ},r))$ corresponding to the shared object 120(1) to be transmitted to the data server 110(2). Among them, the parameter values $X_{USER1}$, $X_{USER2}$ and $X_{OBJ}$ may be any integers. Accordingly, the secret information distributing module can construct the message hiding the shared secret information according to the pairing results corresponding to the user device 130(1), 130(2) and the shared object 120(1). In an embodiment, the message hiding the shared secret information may be one polynomial, and a degree of the polynomial may be, for example, the number of the participants participating in the sharing of the shared object 120(1) plus one.

Lastly, in step S307, the secret information distributing module can separate the pseudo secret information and the message into the sub-secret data and store the sub-secret data to the data servers 110(1) to 110(n) in a decentralized way.

In terms of logistics, the data server 110(2) provided by the local logistics operator (i.e., the object supplier) can confirm all the participants in advance. If the participants are the cell phone owned by the sender, the cell phone owned by the receiver, the smart cabinet and the data server provided by the local logistics operator (i.e., the user device 130(1), 130(2), the shared object 120(1) and the data server 110(2)), the data server 110(2) can provide the conference secret keys to the cell phone owned by the sender, the cell phone owned by the receiver, the smart cabinet and the data server provided by the local logistics operator for generating the sub-secret data by using the conference secret keys so the sub-secret data may then be stored to the data servers 110(1) to 110(n) in the object sharing system 100 in a decentralized way.

The receiver can send a request for opening the smart cabinet (i.e., the shared object 120(1)) to the smart cabinet through the cell phone (i.e., the user device 130(2)) owned by the receiver, and use a private key of the cell phone to generate the conference secret key for a verification performed by the data server 110(2) provided by the local logistics operator (i.e., the object supplier). If the verification is complete, the receiver can then open the smart cabinet through the cell phone owned by the receiver.

Through the above steps, the object sharing system 100 according to the embodiments of the disclosure can use the generated randomly pseudo secret information to prevent hackers from decrypting the shared secret information. Even if hackers are able to decrypt the conference secret key, hackers can only obtain the pseudo secret information at most instead of the shared secret information.

Figure 4:
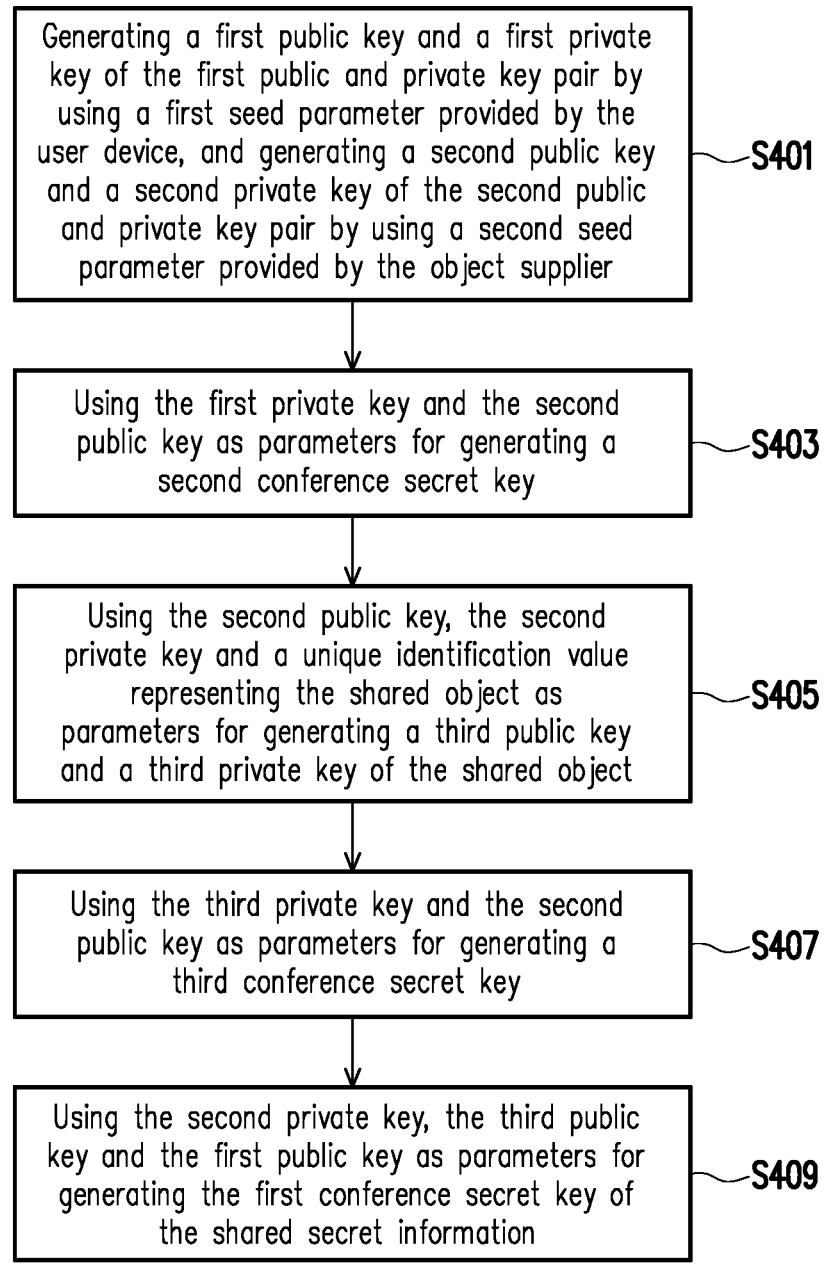
FIG. 4 is a flowchart of a method for generating conference secret keys by a key management module according to an exemplary embodiment of the disclosure.

Furthermore, FIG. 4 is a flowchart of a method for generating conference secret keys by a key management module according to an exemplary embodiment of the disclosure. Referring to FIG. 1 and FIG. 4 together, first, in step S401, the key management module generates a first public key and a first private key of the first public and private key pair by using a first seed parameter respectively provided by the user device 130(1), 130(2), and generates a second public key and a second private key of the second public and private key pair by using a second seed parameter provided by the object supplier.

For instance, the key management module generates a public key $PU_{USER1}$ and a private key $PR_{USER1}$ of the user device 130(1) by using a seed parameter provided by the user device 130(1), generates a public key $PU_{USER2}$ and a private key $PR_{USER2}$ of the user device 130(2) by using a seed parameter provided by the user device 130(2), and generates a public key $PU_{SUPPLY}$ and a private key $PR_{SUPPLY}$ by using a seed parameter provided by the object supplier.

Next, in step S403, the key management module uses the first private key and the second public key as parameters for generating a second conference secret key.

For instance, the key management module can generate a conference secret key $SK_{USER1,SUPPLY}$ of the user device 130(1) corresponding to the object supplier according to the private key $PR_{USER1}$ of the user device 130(1) and the public key $PU_{SUPPLY}$ of the object supplier, and generate a conference secret key $SK_{USER2,SUPPLY}$ of the user device 130(2) corresponding to the object supplier according to the private key $PR_{USER2}$ of the user device 130(2) and the public key $PU_{SUPPLY}$ of the object supplier.

Next, in step S405, the key management module uses the second public key, the second private key and a unique identification value representing the shared object as parameters for generating a third public key and a third private key of the shared object 120(1). In an embodiment, the identification value representing the shared object may be an IP address of the shared object or an object address of the shared object on a block chain network without particular limitations.

For instance, the key management module can generate a public key $PU_{OBJ}$ and a private key $PR_{OBJ}$ of the shared object 120(1) according to the public key $PU_{SUPPLY}$ and the private key $PR_{SUPPLY}$ of the object supplier and the identification value representing the shared object 120(1).

Next, in step S407, the key management module uses the third private key and the second public key as parameters for generating a third conference secret key.

For instance, the key management module can generate a conference secret key $SK_{OBJ,SUPPLY}$ of the shared object 120(1) corresponding to the object supplier according to the private key $PR_{OBJ}$ of the shared object 120(1) and the public key $PU_{SUPPLY}$ of the object supplier.

Lastly, in step S409, the key management module uses the second private key, the third public key and the first public key as parameters for generating the first conference secret key of the shared secret information.

For instance, the key management module can generate the conference secret key $SK_{SUPPLY,USER1}$ of the object supplier corresponding to the user device 130(1), the conference secret key $SK_{SUPPLY,USER2}$ of the object supplier corresponding to the user device 130(2), the conference secret key $SK_{SUPPLY,OBJ}$ of the object supplier corresponding to of the shared object 120(1) according to the private key $PR_{SUPPLY}$ of the object supplier, the public key $PU_{OBJ}$ of the shared object 120(1) and the public keys $PU_{USER1}$ and $PU_{USER2}$ of the user devices 130(1) and 130(2).

In an embodiment, based on Elliptic-Curve Cryptography (ECC), the key management module can generate the public and private key pairs according to the seed parameters. For instance, the seed parameters may be expressed by (CURVE, G, N), in which CURVE is a geometric equation of an elliptic-curve on the finite field: $y^2=x^3+ax+b$; a and b are arbitrary coefficients; G is a base point of all point multiplication operations; N is a multiplicative order of the elliptic-curve, which is a very large prime number; and the geometric meaning of N is that NG=0 (i.e., the result of the point multiplication NG does not exist). Here, one point multiplication may be obtained by multiplying any positive integer less than N and greater than or equal to 1 by G, and the point multiplication is a point on the elliptic-curve. Based on the above, the key management module can select one positive integer from a range [1, N−1] to be set as a private key, and set a product of that private key the base point G as a public key. More specifically, if all the participants participating in the sharing of the shared object 120(1) have the same seed parameter, the key management module can use commutative laws and associative laws to make the first conference secret key, the second conference secret key and the third conference secret key become the same conference secret key. For example, if a first private key $PR_1$ and a second public key $PU_2$ are used as parameters for generating a first conference secret key $SK_1$, and a second private key $PR_2$ and a first public key $PU_1$ are used as parameters for generating a second conference secret key $SK_2$, $SK_1=PR_1\times PU_2=PR_1\times(PR_2\times G)=PR_2\times(PR_1\times G)=PR_2\times PU_1=SK_2$, i.e., the same conference secret key SK will be obtained.

For instance, the conference secret key of the user device 130(1) corresponding to the object supplier may be the product of the private key of the user device 130(1) and the public key of the object supplier; the conference secret key of the user device 130(2) corresponding to the object supplier may be the product of the private key of the user device 130(2) and the public key of the object supplier; the conference secret key of the object supplier corresponding to the user device 130(1) may be the product of the private key of the object supplier and the public key of the user device 130(1); the conference secret key of the object supplier corresponding to the user device 130(2) may be the product of the private key of the object supplier and the public key of the user device 130(2); and the conference secret key of the object supplier corresponding to the shared object 120(1) may be the product of the private key of the object supplier and the public key of the shared object 120(1). Since the key management module adopts ECC described above, the conference secret key of the user device 130(1) corresponding to the object supplier, the conference secret key of the user device 130(2) corresponding to the object supplier, the conference secret key of the object supplier corresponding to the user device 130(1), the conference secret key of the object supplier corresponding to the user device 130(2) and the conference secret key of the object supplier corresponding to the shared object 120(1) will be the same conference secret key.

Through the above steps, the object sharing system 100 according to the embodiment of the disclosure can assign the conference secret keys for the participants participating in the sharing of the shared object 120(1) so hackers cannot obtain the conference key to obtain the access right to the shared object 120(1).

Figure 5:
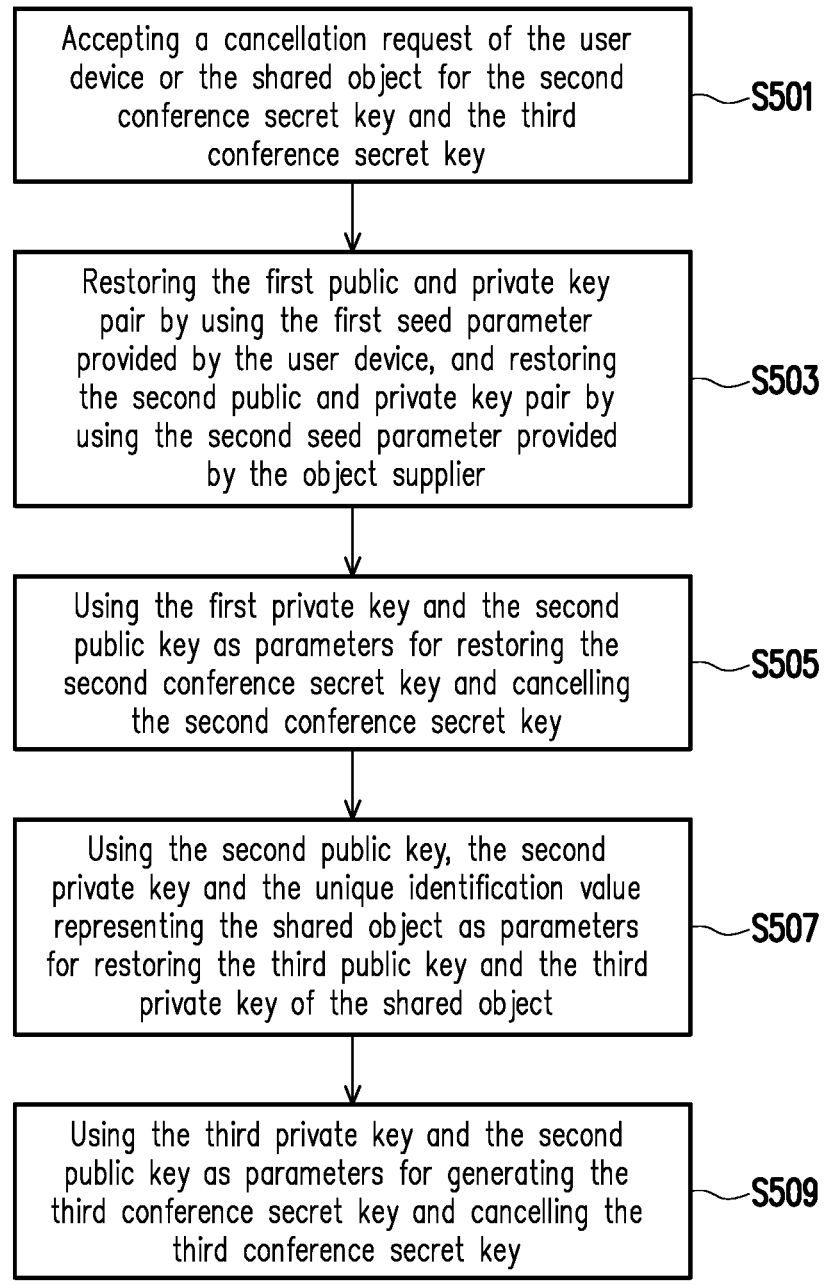
FIG. 5 is a flowchart of a method for cancelling conference secret keys by a key management module according to an exemplary embodiment of the disclosure.

FIG. 5 is a flowchart of a method for cancelling conference secret keys by a key management module according to an exemplary embodiment of the disclosure. Referring to FIG. 1 and FIG. 5, first, in step S501, the key management module can accept a cancellation request of the user device 130(1), 130(2) or the shared object for the second conference secret key and the third conference secret key. Specifically, when the user device 130 or the shared object 120(1) needs to cancel the conference secret key of the user device 130(1) corresponding to the object supplier, the conference secret key of the user device 130(2) corresponding to the object supplier and the conference secret key of the shared object 120(1) corresponding to the object supplier, the user device 130(1), 130(2) or the shared object 120(1) can transmit the cancellation request to the key management module.

Next, in step S503, the key management module restores the first public and private key pair by using the first seed parameter provided by the user device 130, and restores the first public and private key pair by using the second seed parameter provided by the object supplier. Specifically, the user device 130(1), 130(2) and the object supplier respectively transmit the first seed parameter of the user device 130(1), the first seed parameter of the user device 130(2) and the second seed parameter to the key management module so the key management module can restore the public and private key pair of the user device 130(1), 130(2) according to the first seed parameter of the user device 130(1) and the first seed parameter of the user device 130(2), and restore the public and private key pair of the object supplier according to the second seed parameter.

Next, in step S505, the key management module uses the first private key and the second public key as parameters for restoring the second conference secret key and cancelling the second conference secret key. Specifically, when the key management module successfully restores the conference secret key of the user device 130(1) corresponding to the object supplier according to the private key of the user device 130(1) and the public key of the object supplier and successfully restores the conference secret key of the user device 130(2) corresponding to the object supplier according to the private key of the user device 130(2) and the public key of the object supplier, the key management module cancels the conference secret key of the user device 130(1) corresponding to the object supplier and the conference secret key of the user device 130(2) corresponding to the object supplier.

Next, in step S507, the key management module uses the second public key, the second private key and the unique identification value representing the shared object as parameters for restoring the third public key and the third private key of the shared object. Specifically, the key management module restores the public key and the private key of the shared object according to the public key of the object supplier, the private key of the object supplier and the unique identification value representing the shared object 120(1).

Next, in step S509, the key management module uses the third private key and the second public key as parameters for generating the third conference secret key and cancelling the third secret key. Specifically, when the key management module successfully restores the conference secret key of the shared object 120(1) corresponding to the object supplier according to the private key of the shared object 120(1) and the public key of the object supplier, the key management module cancels the conference secret key of the shared object 120(1) corresponding to the object supplier.

Through the above steps, the object sharing system 100 according to the embodiments of the disclosure can cancel the conference secret key under circumstances where the shared secret information has been reconstructed (i.e., used). Since the conference secret key generated by the object sharing system 100 is one-time secret key and will be cancelled immediately after being used, hackers cannot obtain the conference secret key through multiple attempts.

Figure 6:
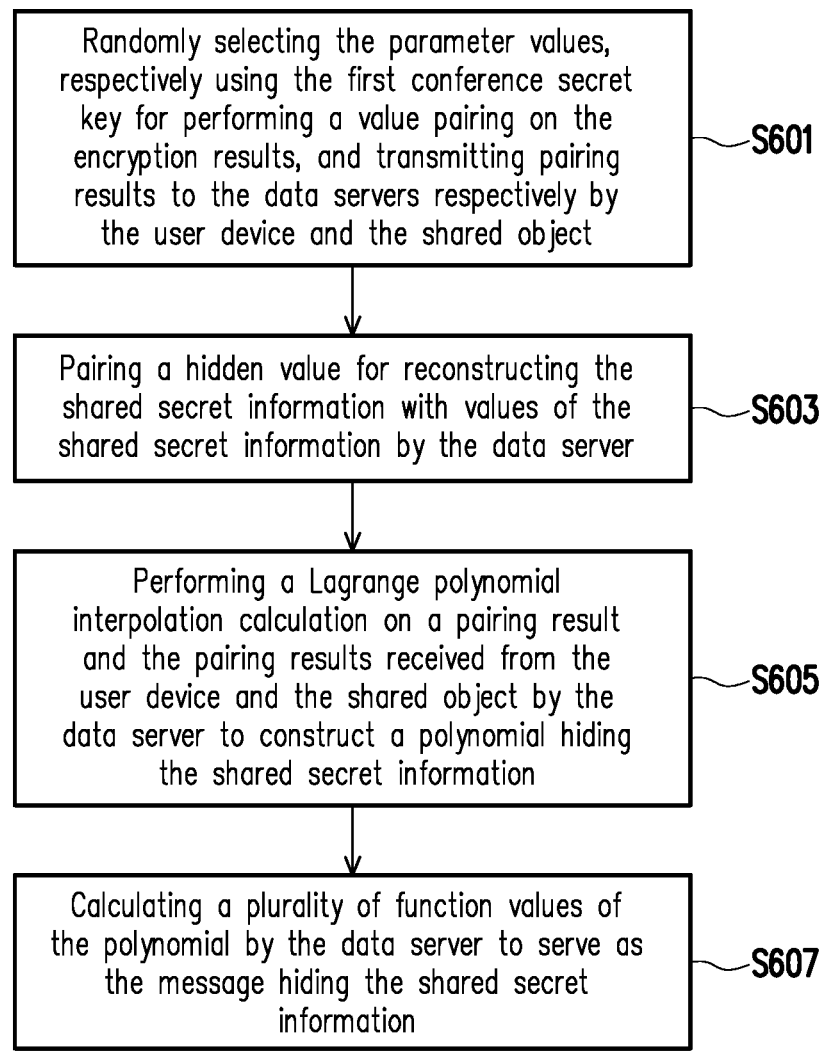
FIG. 6 is a flowchart of a method for storing sub-secret data according to another exemplary embodiment of the disclosure in a decentralized way.

FIG. 6 is a flowchart of a method for storing sub-secret data in a decentralized way according to another exemplary embodiment of the disclosure. Referring to FIG. 1 and FIG. 6 together, first, in step S601, the user device 130(1), 130(2) and the shared object 120(1) can randomly select the parameter values, respectively use the first conference secret key for performing a value pairing on the encryption results, and transmits pairing results to the data servers 110(2).

Specifically, in continuation of the example in FIG. 3, after the secret information distributing module encrypts the pseudo secret information r by using the conference secret keys $SK_{SUPPLY,USER1}$, $SK_{SUPPLY,USER2}$ of the object supplier corresponding to the user device 130(1), 130(2) and the conference secret key $SK_{SUPPLY,OBJ}$ of the object supplier corresponding to the shared object 120(1), the user device 130(1), 130(2) and the shared object 120(1) randomly select the parameter values $X_{USER1}$, $X_{USER2}$ and $X_{OBJ}$ respectively, and use the same to pair with values of the encryption results $(X_{USER1}, E(SK_{SUPPLY,USER1}, r))$, $(X_{USER2}, E(SK_{SUPPLY,USER2}, r))$ corresponding to the user device 130(1), 130(2) and the encryption result $(X_{OBJ}, E(SK_{SUPPLY,OBJ}, r))$ corresponding to the shared object 120(1), so as to generate pairing results $(X_{USER1}, E(SK_{SUPPLY,USER1}, r))$, $(X_{USER2}, E(SK_{SUPPLY,USER2}, r))$ corresponding to the user device 130(1), 130(2) and a pairing result $(X_{OBJ}, E(SK_{SUPPLY,OBJ}, r))$ corresponding to the shared object 120(1) to be transmitted to the data server 110(2). In an embodiment, the secret information distributing module performs the symmetric-key algorithm on the pseudo secret information by using, for example, the conference secret key described above without particular limitations.

Next, in step S603, the data server 110(2) can pair a hidden value for reconstructing the shared secret information with values of the shared secret information.

For instance, the data server 110(2) can select one hidden value (e.g., 0) and pairs the hidden value with values of the shared secret information Secret, so as to generate a pairing result corresponding to the shared secret information, such as (0, Secret).

Next, in step S605, the data server 110(1) can perform a Lagrange polynomial interpolation calculation on the pairing result and the pairing results received from the user device 130 and the shared object 120(1) to construct a polynomial hiding the shared secret information.

For instance, the data server 110(2) can perform the Lagrange polynomial interpolation calculation according to the pairing results $(X_{USER1}, E(SK_{SUPPLY,USER1}, r))$, $(X_{USER2}, E(SK_{SUPPLY,USER2}, r))$ corresponding to the user device 130, the pairing result $(X_{OBJ}, E(SK_{SUPPLY,OBJ}, r))$ corresponding to the shared object 120(1) and the pairing result (0, Secret) corresponding to the shared secret information to generate the polynomial hiding the shared secret information. Here, the degree of the polynomial is the number of the participants participating in the sharing of the shared object 120(1) plus one. In an embodiment, the polynomial hiding the shared secret information may be expressed as:

$$f(x) = Ax^4 + Bx^3 + Cx^2 + Dx + \text{secret} \quad (1)$$

wherein A, B, C and D are coefficients, and secret is the shared secret information.

Lastly, in step S607, the data server 110(2) calculates a plurality of function values of the polynomial to serve as the message hiding the shared secret information. Specifically, the data server 110(2) can substitute a plurality of values into the polynomial to obtain the function values, and broadcast the pseudo secret information and the function values to the distributed data redundancy network formed by the data servers 110(1) to 110(n).

In an embodiment, for the encryption results of the pseudo secret information, the secret information distributing module can further calculate a plurality of hash values by using a one-way hash algorithm, and use the calculated hash values together with the pseudo secret information and the function values as the sub-secret data and store the sub-secret data to the data servers 110(1) to 110(n) in a decentralized way. Here, in this embodiment, the one-to-one feature of the one-way hash algorithm is used to solve the problem that the original secret sharing algorithm cannot verify the identity of the participant, so as avoid a conspiracy attack.

Through the above steps, the object sharing system 100 according to the embodiments of the disclosure can hide the shared secret information in the polynomial, and use the function values of the polynomial as the sub-secret data for reconstructing the shared secret information to be stored to the data servers 110(1) to 110(n) in a decentralized way. In this way, when the shared secret information needs to be reconstructed after receiving the access request for the shared object, the object sharing system 100 can reconstruct the polynomial by obtaining a certain quantity of sub-secret data, and substitute the hidden value for reconstructing the shared secret information into the polynomial so the shared secret information may be obtained.

Figure 7:
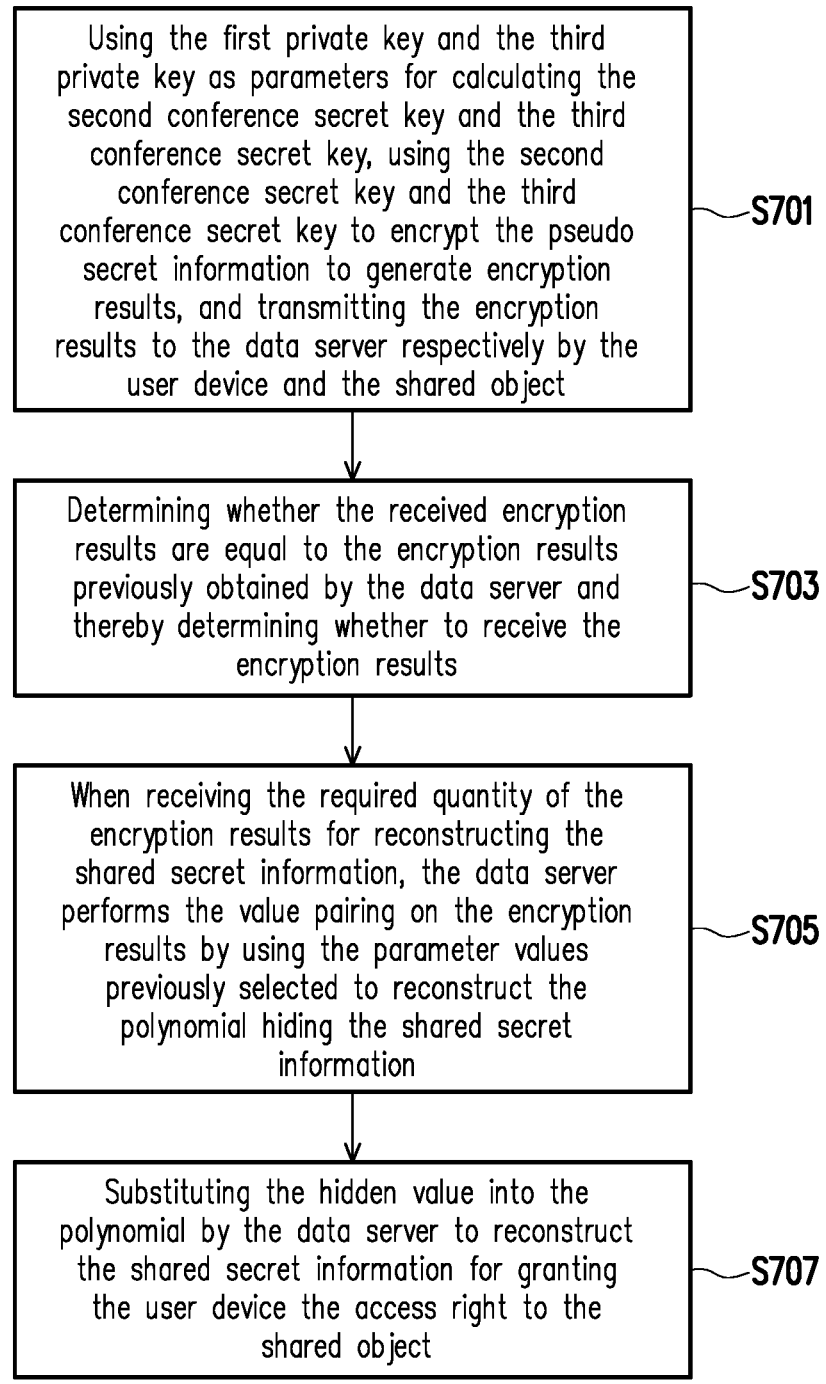
FIG. 7 is a flowchart of a method for reconstructing shared secret information according to an exemplary embodiment of the disclosure.

Specifically, FIG. 7 is a flowchart of a method for reconstructing shared secret information according to an exemplary embodiment of the disclosure. Referring to FIG. 1 and FIG. 7 together, the method of this embodiment is adapted to a situation in which the secret information reconstruction module is installed on the data server 110(2).

First in step S701, the user device 130(2) and the shared object 120(1) can respectively use the first private key and the third private key as parameters for calculating the second conference secret key and the third conference secret key, use the same to encrypt the pseudo secret information to generate encryption results, and transmit the encryption results to the data server 110(2). Specifically, when receiving the access request for the provided shared object 120(1) from the user device 130(2), the secret information reconstruction module of the data server 110(2) collects the required quantity of the sub-secret data for reconstructing the secret information reconstruction module via the distributed data redundancy network. At the time, the user device 130(2) and the shared object 120(1) respectively calculate the conference secret key of the user devices 130(2) corresponding to the object supplier and the conference secret key of the shared object 120(1) corresponding to the object supplier according to the private key stored by the user device 130 and the private key of the shared object 120(1), obtain the pseudo secret information from the sub-secret data broadcasted to the data servers 110(1) to 110(n), respectively encrypt the pseudo secret information by using the conference secret key of the user devices 130(2) corresponding to the object supplier and the conference secret key of the shared object 120(1) corresponding to the object supplier, and generate an encryption result of the user device 130(2) corresponding to the object supplier and an encryption result of the shared object 120(1) corresponding to the object supplier.

Next, in step S703, the data server 110(2) can determine whether the received encryption results are equal to the encryption results previously obtained to thereby determine whether to receive the encryption results. Specifically, if the data server 110(2) determines that the encryption result of the user device 130(2) corresponding to the object supplier is equal to the encryption result of the user device 130(2) corresponding to the object supplier previously stored and the encryption result of the shared object 120(1) corresponding to the object supplier is equal to the encryption result of the shared object 120(1) corresponding to the object supplier previously stored, the data server 110(2) will receive the encryption results and continue to determine and collect the other encryption results.

Next, in step S705, when the data server 110(2) receives the required quantity of the encryption results for reconstructing the shared secret information, the data server 110(2) can perform the value pairing on the encryption results by using the parameter values previously selected to reconstruct the polynomial hiding the shared secret information. Specifically, if the required quantity is preset to 2, after the encryption result of the user device 130(2) corresponding to the object supplier and the encryption result of the shared object 120(1) corresponding to the object supplier are received by the data server 110(2), the data server 110(2) can perform the value pairing on the encryption result of the user device 130(2) corresponding to the object supplier and the encryption result of the shared object 120(1) corresponding to the object supplier respectively by using the parameter values previously selected by the user device 130(2) and the object supplier, so as to reconstruct the polynomial hiding the shared secret information based on the Lagrange polynomial interpolation calculation.

Lastly, in step S707, the data server 110(2) substitutes the hidden value into the polynomial to reconstruct the shared secret information for granting the user device the access right to the shared object 120(1). Specifically, if the hidden value is set to 0 and substituted into the formula (1), the shared secret information may then be obtained. In the case where the correct shared secret information may be obtained, the data server 110(2) can grant the user device the access right to the shared object 120(1).

Through the above steps, the object sharing system 100 according to the embodiments of the disclosure can simply use some of the sub-secret data to reconstruct the shared secret information for verifying the access right to the shared object 120(1) for the user device 130(2). In this way, the object sharing system 100 can verify the access right to the shared object 120(1) for the user device 130(2) without obtaining all the sub-secret data so a verification performance on the access right can be improved accordingly.

In terms of logistics, the receiver can send a request for opening the smart cabinet to the smart cabinet (i.e., the shared object 120(1)) through the cell phone (i.e., the user device 130(2)) owned by the receiver, and use a private key of the cell phone to generate the conference secret key for a verification performed by the data server 110(2) provided by the local logistics operator (i.e., the object supplier). If the verification is complete, the receiver can then open the smart cabinet through the cell phone owned by the receiver.

Figure 8:
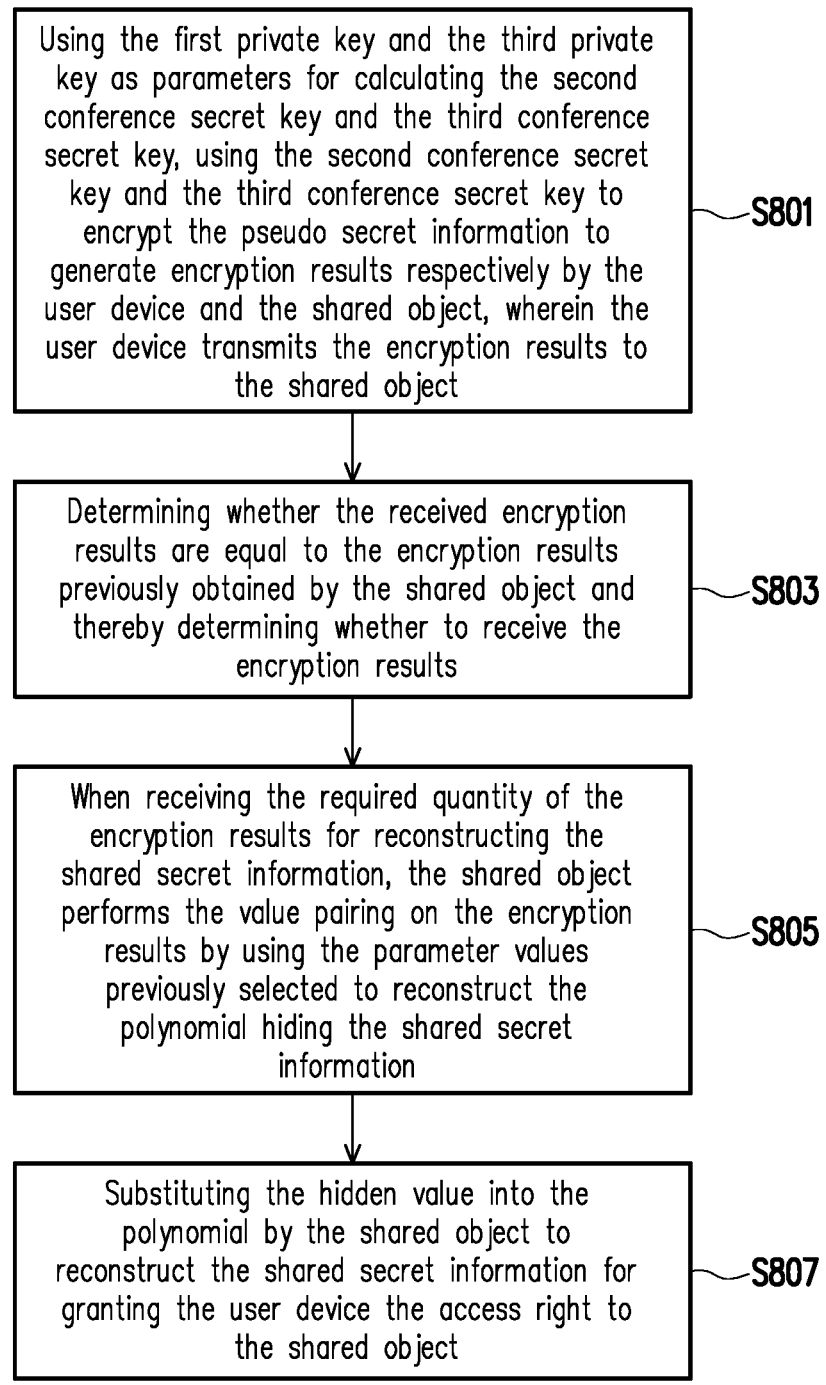
FIG. 8 is a flowchart of a method for reconstructing shared secret information according to another exemplary embodiment of the disclosure.

FIG. 8 is a flowchart of a method for reconstructing shared secret information according to another exemplary embodiment of the disclosure. This embodiment is adapted to a situation in which the secret information reconstruction module is installed on the shared object 120(1).

Referring to FIG. 1 and FIG. 8 together, first, in step S801, the user device 130(2) and the shared object 120(1) respectively use the first private key and the third private key as parameters for calculating the second conference secret key and the third conference secret key and use the same to encrypt the pseudo secret information to generate encryption results. Here, the user device 130(2) transmits the encryption results to the shared object 120(1).

Next, in step S803, the shared object 120(1) determines whether the received encryption results are equal to the encryption results previously obtained to thereby determine whether to receive the encryption results. If the encryption results are determined to be equal to one another, the shared object 120(1) receives the encryption results and continues to collect the other encryption results.

Next, in step S805, when receiving the required quantity of the encryption results for reconstructing the shared secret information, the shared object 120(1) can perform the value pairing on the encryption results by using the parameter values previously selected to reconstruct the polynomial hiding the shared secret information.

Lastly, in step S807, the shared object substitutes the hidden value into the polynomial to reconstruct the shared secret information for granting the user device the access right to the shared object.

The difference between FIG. 7 and FIG. 8 lies in that the step of reconstructing the shared secret information is executed by the data server 110(2) in FIG. 8 while the step of reconstructing the shared secret information is executed by the shared object 120(1) in FIG. 7. Other than that, steps in FIG. 8 are identical to steps of FIG. 7, so the reference can be made to the description for FIG. 7.

In summary, the decentralized architecture adopted by the object sharing system and the method thereof in this disclosure can avoid the risk of centralized single point attack and prevent hackers from invading and obtaining the shared secret information. In addition, when generating the conference secret keys, the object sharing system and the method thereof can reassign the conference secret keys so hackers cannot obtain the conference secret key through multiple attempts. Moreover, the object sharing system and the method thereof can also avoid the conspiracy attack by using the one-way hash algorithm.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. An object sharing system, comprising:
   a plurality of physical shared objects, respectively provided by a plurality of physical object suppliers; and
   a plurality of physical data servers, respectively provided by the object suppliers and connected to form a distributed data redundancy network so as to store a plurality of sub-secret data separated from shared secret information in a decentralized way, wherein the data server of each of the object suppliers is connected to the shared objects provided by the object supplier, and collects a required quantity of sub-secret data for reconstructing the shared secret information via the distributed data redundancy network so as to reconstruct the shared secret information for verifying an access right to the shared object for a physical user device when receiving an access request for the shared object from the user device, wherein each of the data servers comprises:

generating at least one first conference secret key of the shared secret information by using a first public and private key pair of the user device and a second public and private key pair of the object supplier; and randomly generating pseudo secret information corresponding to the shared secret information agreed and shared by a plurality of participants participating in a sharing of the shared object, encrypting the pseudo secret information by using the first conference secret key and pairing encryption results with parameter values being randomly selected to construct a message hiding the shared secret information, and separating the pseudo secret information and the message into the sub-secret data and storing the sub-secret data to the data servers in the decentralized way.

2. The object sharing system according to claim 1, wherein the data server further calculates a plurality of hash values of the encryption results of the pseudo secret information by a one-way hash algorithm, separates the hash values, the pseudo secret information and the message into the sub-secret data, and stores the sub-secret data to the data servers in the decentralized way.

3. The object sharing system according to claim 1, wherein the data server comprises: generating a first public key and a first private key of the first public and private key pair by using a first seed parameter provided by the user device, and generating a second public key and a second private key of the second public and private key pair by using a second seed parameter provided by the object supplier; using the first private key and the second public key as parameters for generating a second conference secret key; using the second public key, the second private key and a unique identification value representing the shared object as parameters for generating a third public key and a third private key of the shared object; using the third private key and the second public key as parameters for generating a third conference secret key; and using the second private key, the third public key and the first public key as parameters for generating the first conference secret key of the shared secret information.

4. The object sharing system according to claim 3, wherein the data server further comprises: accepting a cancellation request of the user device or the shared object for the second conference secret key and the third conference secret key; restoring the first public and private key pair by using the first seed parameter provided by the user device, and restoring the second public and private key pair by using the second seed parameter provided by the object supplier; using the first private key and the second public key as parameters for restoring the second conference secret key and cancelling the second conference secret key; using the second public key, the second private key and the unique identification value representing the shared object as parameters for restoring the third public key and the third private key of the shared object; and using the third private key and the second public key as parameters for generating the third conference secret key and cancelling the third secret key.

5. The object sharing system according to claim 3, wherein each of the user device and the shared object randomly selects the parameter values, uses the first conference secret key for performing a value pairing on the encryption results, and transmits pairing results to the data servers, respectively; and the data server pairs a hidden value for reconstructing the shared secret information with values of the shared secret information, performs a Lagrange polynomial interpolation calculation on a pairing result and the pairing results received from the user device and the shared object to construct a polynomial hiding the shared secret information, and calculates a plurality of function values of the polynomial to be the message hiding the shared secret information.

6. The object sharing system according to claim 5, wherein the data server further comprises: receiving the access request for the provided shared object from the user device, and collecting the required quantity of the sub-secret data for reconstructing the shared secret information via the distributed data redundancy network, wherein the user device and the shared object respectively use the first private key and the third private key as parameters for calculating the second conference secret key and the third conference secret key, use the second conference secret key and the third conference secret key to encrypt the pseudo secret information to generate encryption results, and transmit the encryption results to the data server; and the data server determines whether the received encryption results are equal to the encryption results previously obtained to thereby determine whether to receive the encryption results, performs the value pairing on the encryption results by using the parameter values previously selected to reconstruct the polynomial hiding the shared secret information when the required quantity of the encryption results for reconstructing the shared secret information is received, and substitutes the hidden value into the polynomial to reconstruct the shared secret information for granting the user device the access right to the shared object.

7. The object sharing system according to claim 5, wherein the shared object further comprises: receiving the access request for the provided shared object from the user device, and collecting the required quantity of the sub-secret data for reconstructing the shared secret information via the distributed data redundancy network by using the data server, wherein the user device and the shared object respectively use the first private key and the third private key as parameters for calculating the second conference secret key and the third conference secret key configured to encrypt the pseudo secret information to generate encryption results; and the shared object determines whether the received encryption results are equal to the encryption results previously obtained to thereby determine whether to receive the encryption results, performs the value pairing on the encryption results by using the parameter values previously selected to reconstruct the polynomial hiding the shared secret information when the shared object receives the required quantity of the encryption results for reconstructing the shared secret information, and substitutes the hidden value into the polynomial to reconstruct the shared secret information for granting the user device the access right to the shared object.

8. The object sharing system according to claim 1, wherein the data server performs a symmetric-key algorithm on the pseudo secret information by using the first conference secret key.

9. The object sharing system according to claim 1, wherein when the shared secret information is separated into n shared secret data, the data server collects (n+1) sub-secret data via the distributed data redundancy network to reconstruct the shared secret information, wherein n is an integer greater than 2.

10. An object sharing method, adapted to an object sharing system comprising a plurality of shared objects and a plurality of data servers respectively provided by a plurality of object suppliers,
wherein each of the data servers is connected to each other to form a distributed data redundancy network, and the method comprises:
storing a plurality of sub-secret data separated from shared secret information in a decentralized way by the data servers;
receiving, by one of the shared objects, an access request sent by a user device;
collecting a required quantity of the sub-secret data for reconstructing the shared secret information via the distributed data redundancy network by the data server connected to the shared object; and
reconstructing the shared secret information using the collected sub-secret data for verifying an access right to the shared object for the user device by the shared object or the data server connected to the shared object,
wherein the step of storing the sub-secret data separated from the shared secret information in the decentralized way by the data servers comprises:
generating at least one first conference secret key of the shared secret information by using a first public and private key pair of the user device and a second public and private key pair of the object supplier;
randomly generating pseudo secret information corresponding to the shared secret information agreed and shared by a plurality of participants participating in a sharing of the shared object;
encrypting the pseudo secret information by using the first conference secret key and pairing encryption results with parameter values being randomly selected to construct a message hiding the shared secret information; and
separating the pseudo secret information and the message into the sub-secret data and storing the sub-secret data to the data servers in the decentralized way.

11. The method according to claim 10, wherein the step of storing the sub-secret data separated from the shared secret information in the decentralized way by the data servers further comprises: calculating a plurality of hash values of the encryption results of the pseudo secret information by a one-way hash algorithm, separating the hash values, the pseudo secret information and the message into the sub-secret data, and storing the sub-secret data to the data servers in the decentralized way.

12. The method according to claim 10, wherein the step of generating the at least one first conference secret key of the shared secret information by using the first public and private key pair of the user device and the second public and private key pair of the object supplier comprises: generating a first public key and a first private key of the first public and private key pair by using a first seed parameter provided by the user device, and generating a second public key and a second private key of the second public and private key pair by using a second seed parameter provided by the object supplier; using the first private key and the second public key as parameters for generating a second conference secret key; using the second public key, the second private key and a unique identification value representing the shared object as parameters for generating a third public key and a third private key of the shared object; using the third private key and the second public key as parameters for generating a third conference secret key; and using the second private key, the third public key and the first public key as parameters for generating the first conference secret key of the shared secret information.

13. The method according to claim 12, further comprising: accepting a cancellation request of the user device or the shared object for the second conference secret key and the third conference secret key; restoring the first public and private key pair by using the first seed parameter provided by the user device, and restoring the second public and private key pair by using the second seed parameter provided by the object supplier; using the first private key and the second public key as parameters for restoring the second conference secret key and cancelling the second conference secret key; using the second public key, the second private key and the unique identification value representing the shared object as parameters for restoring the third public key and the third private key of the shared object; and using the third private key and the second public key as parameters for generating the third conference secret key and cancelling the third secret key.

14. The method according to claim 12, wherein the step of storing the sub-secret data separated from the shared secret information in the decentralized way by the data servers further comprises: randomly selecting the parameter values, using the first conference secret key for performing a value pairing on the encryption results, and transmitting pairing results to the data servers by the user device and the shared object, respectively; pairing a hidden value for reconstructing the shared secret information with values of the shared secret information by the data server; performing a Lagrange polynomial interpolation calculation on a pairing result and the pairing results received from the user device and the shared object by the data server to construct a polynomial hiding the shared secret information; and calculating a plurality of function values of the polynomial by the data server to be the message hiding the shared secret information.

15. The method according to claim 14, wherein the step of using the collected sub-secret data to reconstruct the shared secret information by the shared object or the data server connected to the shared object comprises: using the first private key and the third private key as parameters for calculating the second conference secret key and the third conference secret key, using the second conference secret key and the third conference secret key to encrypt the pseudo secret information to generate encryption results, and transmitting the encryption results to the data server by the user device and the shared object, respectively; determining whether the received encryption results are equal to the encryption results previously obtained by the data server to thereby determine whether to receive the encryption results; when the data server receives the required quantity of the encryption results for reconstructing the shared secret information, performing the value pairing on the encryption results by using the parameter values previously selected to reconstruct the polynomial hiding the shared secret information; and substituting the hidden value into the polynomial by the data server to reconstruct the shared secret information for granting the user device the access right to the shared object.

16. The method according to claim 14, wherein the step of using the collected sub-secret data to reconstruct the shared secret information by the shared object or the data server connected to the shared object comprises: using the first private key and the third private key as parameters for calculating the second conference secret key and the third conference secret key respectively by the user device and the shared object, and encrypting the pseudo secret information by using the second conference secret key and the third conference secret key to generate encryption results, wherein the user device transmits the encryption results to the shared object; and determining whether the received encryption results are equal to the encryption results previously obtained by the shared object to thereby determine whether to receive the encryption results; when the shared object receives the required quantity of the encryption results for reconstructing the shared secret information, performing the value pairing on the encryption results by using the parameter values previously selected to reconstruct the polynomial hiding the shared secret information; and substituting the hidden value into the polynomial by the shared object to reconstruct the shared secret information for granting the user device the access right to the shared object.

17. The method according to claim 10, wherein the step of encrypting the pseudo secret information by using the first conference secret key comprises: performing a symmetric-key algorithm on the pseudo secret information by using the first conference secret key.

18. The method according to claim 10, wherein the step of using the collected sub-secret data to reconstruct the shared secret information by the shared object or the data server connected to the shared object comprises: when the shared secret information is separated into n shared secret data, collecting (n+1) sub-secret data via the distributed data redundancy network by the shared object or the data servers in order to reconstruct the shared secret information, wherein n is an integer greater than 2.

* * * * *